US012753274B2

(12) United States Patent
Uchiyama

(10) Patent No.: US 12,753,274 B2
(45) Date of Patent: Oct. 6, 2026

(54) AROMATIC POLYESTER AND METHOD FOR PRODUCING SAME

(71) Applicant: TOYOBO CO., LTD., Osaka (JP)

(72) Inventor: Shoko Uchiyama, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 718 days.

(21) Appl. No.: 17/799,063

(22) PCT Filed: Feb. 5, 2021

(86) PCT No.: PCT/JP2021/004433
§ 371 (c)(1),
(2) Date: Aug. 11, 2022

(87) PCT Pub. No.: WO2021/166700
PCT Pub. Date: Aug. 26, 2021

(65) Prior Publication Data

US 2023/0100664 A1 Mar. 30, 2023

(30) Foreign Application Priority Data

Feb. 17, 2020 (JP) ................................ 2020-024137

(51) Int. Cl.
*C08G 63/06* (2006.01)
*C09D 167/04* (2006.01)
*C09J 167/04* (2006.01)

(52) U.S. Cl.
CPC ......... *C08G 63/065* (2013.01); *C09D 167/04* (2013.01); *C09J 167/04* (2013.01)

(58) Field of Classification Search
None
See application file for complete search history.

(56) References Cited

U.S. PATENT DOCUMENTS 3,340,083 A * 9/1967 Robitschek .......... C08G 63/676 428/221
3,725,461 A * 4/1973 Jamison ................. C08G 63/58 528/297
4,921,883 A * 5/1990 Meixner .............. C08G 63/553 528/298
2006/0110674 A1* 5/2006 Maehata ............ G03G 9/08726 430/109.3
2007/0213501 A1 9/2007 Bruchmann et al.
2009/0275680 A1 11/2009 Bruchmann et al.
2009/0281271 A1 11/2009 Bruchmann et al.
2011/0262637 A1 10/2011 Jansen et al.
2011/0269908 A1 11/2011 Jansen et al.
2011/0274833 A1 11/2011 Jansen et al.
2012/0095160 A1 4/2012 Szkudlarek et al.
2012/0101226 A1 4/2012 Szkudlarek et al.
2012/0121839 A1 5/2012 Szkudlarek et al.
2012/0121841 A1 5/2012 Szkudlarek et al.
2012/0136117 A1 5/2012 Szkudlarek et al.
2012/0157618 A1 6/2012 Szkudlarek et al.
2016/0009949 A1 1/2016 Jansen et al.
2016/0009950 A1 1/2016 Jansen et al.
2016/0017153 A1 1/2016 Jansen et al.

FOREIGN PATENT DOCUMENTS

JP 51-13888 2/1976
JP 51-124190 10/1976
JP 63-172728 7/1988
JP 6-138701 5/1994
JP 7-2995 1/1995
JP H072995 A * 1/1995 ............ C08G 63/52
JP 2001-302779 10/2001
JP 2003-306535 10/2003
JP 2006-169509 6/2006
JP 2008-501048 1/2008
JP 2012-521469 9/2012
JP 2013-73015 4/2013
JP 2015-82070 4/2015

OTHER PUBLICATIONS

JPH072995 English Machine Translation, prepared Mar. 24, 2025. (Year: 2025).*
Farhood Najafi et al., "Synthesis and Characterization of Block Copolymers from Aromatic Diols, Fumaric Acid, Sebacic Acid and PEG", Journal of Applied Polymer Science, (2003), vol. 90, pp. 2358 2363.
Japanese Office Action issued Mar. 22, 2023 in corresponding Japanese Patent Application No. 2022-501802, with English Translation.
Decision of Refusal dated Aug. 8, 2023 in corresponding Japanese Patent Application No. 2022-501802, with English-language translation.
Office Action issued May 31, 2024 in Indonesian Patent Application No. P00202208688, with English-language Translation.
Office Action issued Apr. 3, 2024 in Chinese Patent Application No. 202180012236.5, with English-language Translation.
Chinese Office Action issued Nov. 13, 2023 in corresponding Chinese Patent Application No. 202180012236.5, with English machine translation.
Partial Supplementary European Search Report issued Feb. 26, 2024 in European Patent Application No. 21756936.7.
Office Action issued Apr. 27, 2023 in corresponding Chinese application No. 202180012236.5, with English machine translation.

(Continued)

*Primary Examiner* — Christopher M Rodd
(74) *Attorney, Agent, or Firm* — Wenderoth, Lind & Ponack, L.L.P.

(57) ABSTRACT

The present invention provides an aromatic polyester having several operative functional groups and a method for producing same. An aromatic polyester comprising a polycarboxylic acid component and a polyhydric alcohol component as a copolymerization component, wherein the aromatic polyester comprises a polycarboxylic acid component having an operative functional group by 50 mol % or more when a total amount of the polycarboxylic acid component is taken as 100 mol %, and the aromatic polyester comprises an aromatic polyhydric alcohol component by 50 mol % or more when a total amount of the polyhydric alcohol component is taken as 100 mol %.

11 Claims, No Drawings

(56) References Cited

OTHER PUBLICATIONS

International Search Report issued Apr. 20, 2021 in International (PCT) Application No. PCT/JP2021/004433.
Office Action issued Apr. 16, 2024 in Taiwanese Patent Application No. 110103156, with English-language Translation.
Office Action issued Mar. 29, 2025 in Korean Patent Application No. 10-2022-7031844, with English-language Translation.
Office Action issued Jan. 14, 2025 in Japanese Patent Application No. 2023-190900, with English-language Translation.

* cited by examiner

AROMATIC POLYESTER AND METHOD FOR PRODUCING SAME

TECHNICAL FIELD

The present invention relates to an aromatic polyester having a functional group. More specifically, the present invention relates to an aromatic polyester having an operative functional group that can be produced by polymerization while retaining an operative functional group derived from carboxylic acid component without causing gelation.

BACKGROUND ART

Copolymerized polyester resin is widely used as a raw material for resin composition applied to a paint, a coating, an adhesive and the like. Copolymerized polyester resin is generally composed of polycarboxylic acid and polyhydric alcohol. We can freely select and combine the polycarboxylic acid and the polyhydric alcohol, and control height of molecular weight. The produced copolymerized polyester resin is used in various applications, including a paint application or an adhesive application. Especially, an aromatic polyester is industrially useful because of its excellent heat resistance and chemical resistance.

Among them, the aromatic polyester having a branched functional group (an operative functional group), which does not involve in polymerization, such as hydroxy group or carboxy group and the like is particularly and industrially useful because of its good reactivity with a curing agent and the like. For example, Patent Literature 1 discloses polyester resin having a polymerizable double bond. Patent Literature 2 also discloses an unsaturated polyester resin comprising an ester unit of itaconic acid as a reactive unsaturated site.

In contrast, an example of an aliphatic polyester having several operative functional groups, which was synthesized using rare-earth triflate catalyst, has been reported (Patent Literature 3).

CITATION LIST

Patent Literature

Patent Literature 1: JP 2001-302779 A

Patent Literature 2: JP 2012-521469 A

Patent Literature 3: JP 2003-306535 A

SUMMARY OF THE INVENTION

Problems to be Solved by the Invention

However, although the polyester resin in Patent Literature 1 has a polymerizable double bond as the operative functional group, it needs a large amount of monomers not having the operative functional group as the copolymerization component. Therefore, the concentration thereof is low and it cannot be said that the resin has high industrial utility value. Additionally, we found that increase of concentration of polymerizable double bond in the polyester resin caused isomerization or gelation due to three-dimensional cross-links during polymerization. Patent Literature 2 discloses polyester resin produced by polycondensation of at least one type of polyols and unsaturated carboxylic acids such as itaconic acid, citraconic acid and/or mesaconic acid, however, the resin does not comprise aromatic skeleton. Further, for suppressing isomerization or gelation during polymerization, radical inhibitor is needed as an essential component. Therefore, it has low industrial utility value and is also cause of impurities. Additionally, in Patent Literature 3, polycondensation of aliphatic monomers having various functional groups (operative functional groups) except for a functional group involved in polymerization is investigated. However, aromatic monomers are not considered. This is because, in case of the direct polymerization of dicarboxylic acid and diol, aromatic dicarboxylic acid with a melting point of 300° C. or higher and diol are generally subjected to esterification reaction at a high temperature such as a diol's boiling point or more (for example, 200 to 240° C.), thus a large amount of energy is consumed during polycondensation. Furthermore, there are technical reasons why both terephthalic acid and isophthalic acid, which are generally used as raw materials for aromatic polyester, have a melting point of 300° C. or higher, and because of sublimable crystals, they are difficult to handle.

The present invention is aim to provide an aromatic polyester having several operative functional groups that does not involve in polymerization, which have been difficult to synthesize before, and a method for synthesizing same.

Solution to the Problems

As a result of thorough research of the present inventors, they found that the above problems could be solved by means discussed above, and completed the present invention. Thus, the present invention has the following points.

An aromatic polyester comprising a polycarboxylic acid component and a polyhydric alcohol component as a copolymerization component, wherein, the aromatic polyester comprises a polycarboxylic acid component having an operative functional group by 50 mol % or more when a total amount of the polycarboxylic acid component is taken as 100 mol %, and the aromatic polyester comprises an aromatic polyhydric alcohol component by 50 mol % or more when a total amount of the polyhydric alcohol component is taken as 100 mol %.

It is preferable that the operative functional group is one or more selected from the group consisting of hydroxy group, sulfanyl group, carboxy group, formyl group, azido group, halogen, disulfide group, sulfonyl group, sulfanyl group and methylidene group.

It is preferable that the aromatic polyester comprising a constitutional unit represented by the following formula (1):

[Chemical formula 1]

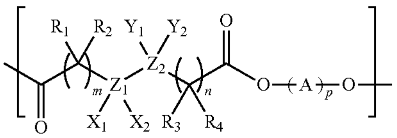

(1)

(in the formula (1), $X_1$, $X_2$, $Y_1$ and $Y_2$ are each independently hydrogen, alkyl group, hydroxy group, sulfanyl group, carboxy group, formyl group, azido group, halogen, oxygen or methylidene group.

$Z_1$—$X_1$ bond, $Z_1$—$X_2$ bond, $Z_2$—$Y_1$ bond and $Z_2$—$Y_2$ bond are each independently a single bond or a double bond.

$Z_1$—$Z_2$ bond is a single bond, a double bond or an S—S bond.

When $X_1$, $X_2$, $Y_1$ and $Y_2$ are all hydrogen or alkyl group; $Z_1$—$X_1$ bond, $Z_1$—$X_2$ bond, $Z_2$—$Y_1$ bond and $Z_2$—$Y_2$ bond are all single bonds and $Z_1$—$Z_2$ bond is a double bond.

When $Z_1$—$Z_2$ bond is an S—S bond; $X_1$, $X_2$, $Y_1$ and $Y_2$ are each independently oxygen or absent.

When $X_1$ is methylidene group; $Z_1$—$X_1$ bond is a double bond, $X_2$ is absent, $Z_1$—$Z_2$ bond is a single bond.

When $X_2$ is methylidene group; $Z_1$—$X_2$ bond is a double bond, $X_1$ is absent, $Z_1$—$Z_2$ bond is a single bond.

When $Y_1$ is methylidene group; $Z_2$—$Y_1$ bond is a double bond, $Y_2$ is absent, $Z_1$—$Z_2$ bond is a single bond.

When $Y_2$ is methylidene group; $Z_2$—$Y_2$ bond is a double bond, $Y_1$ is absent, $Z_1$—$Z_2$ bond is a single bond.

"A" is a residue of the aromatic polyhydric alcohol.

$R_1$, $R_2$, $R_3$ and $R_4$ are each independently hydrogen or alkyl group.

"m" and "n" each independently represent an integer of 0 to 10.

"p" represents an integer of 1 to 10.)

The aromatic polyester preferably comprises fluorine by 500 mass ppm or more, and sulfur by 250 mass ppm or more. It is preferable that the aromatic polyester is substantially free from an organic solvent. Additionally, the aromatic polyester is produced by a process comprising a step of low-temperature melt polycondensation at 80 to 150° C.

An adhesive or a paint comprising the aromatic polyester.

Advantageous Effects of the Invention

The aromatic polyester of the present invention comprises a predetermined amount of the operative functional group. When the operative functional group is a double bond, the aromatic polyester comprising a double bond at a main chain gives a reactive site for thiol-ene reaction and Michael addition reaction. Additionally, when the operative functional group is halogen, the aromatic polyester comprising halogen at a main chain enables various chemical modifications, such as giving a site for initiating living radical polymerization, and the like.

DESCRIPTION OF EMBODIMENTS

The aromatic polyester of the present invention is a resin comprising a polycarboxylic acid component and a polyhydric alcohol component as a copolymerization component, wherein the aromatic polyester comprises a polycarboxylic acid component having an operative functional group by 50 mol % or more when a total amount of the polycarboxylic acid component is taken as 100 mol %, and the aromatic polyester comprises an aromatic polyhydric alcohol component by 50 mol % or more when a total amount of the polyhydric alcohol component is taken as 100 mol %.

The operative functional group is preferably a reactive functional group except for the functional group involved in polymerization (dicarboxylic acid). Specifically, the operative functional group is preferably one or more selected from the group consisting of hydroxy group (—OH), sulfanyl group (—SH), carboxy group (—$CO_2$H), formyl group (—CHO), azido group (—$N_3$), halogen (—F, —Cl, —Br, —I), disulfide group (—S—S—), sulfinyl group (—S(=O)—), sulfonyl group (—S(=O)$_2$—) and methylidene group (=$CH_2$.

The polycarboxylic acid component having an operative functional group is exemplified by an aromatic polycarboxylic acid having an operative functional group, an aliphatic polycarboxylic acid having an operative functional group or an alicyclic polycarboxylic acid having an operative functional group, preferably an aromatic dicarboxylic acid having an operative functional group, an aliphatic dicarboxylic acid having an operative functional group or an alicyclic dicarboxylic acid having an operative functional group, and more preferably an aliphatic dicarboxylic acid having an operative functional group.

The polycarboxylic acid component having an operative functional group is not particularly limited, and exemplified by maleic acid (an unsaturated bond), fumaric acid (an unsaturated bond), citraconic acid (an unsaturated bond), itaconic acid (an unsaturated bond), malic acid (OH), tartaric acid (OH), thiomalic acid (SH), bromosuccinic acid (Br), azidosuccinic acid ($N_3$), 3,3-dithiodipropionic acid (S—S), tricarboxylic acid (COOH) and the like. Among them, one type or two or more types may be selected and used.

When a total amount of the polycarboxylic acid component in the aromatic polyester is taken as 100 mol %, the aromatic polyester needs to comprise the polycarboxylic acid component having an operative functional group by 50 mol % or more, preferably 60 mol % or more, more preferably 70 mol % or more, further preferably 80 mol % or more, much further preferably 90 mol % or more, especially preferably 95 mol % or more, most preferably 99 mol % or more, and 100 mol % may be acceptable.

Furthermore, as a copolymerization component, a polycarboxylic acid component except for the polycarboxylic acid component having an operative functional group may be used in combination. The polycarboxylic acid component except for the polycarboxylic acid component having an operative functional group is preferably a polycarboxylic acid not having a reactive functional group except for a functional group involved in polymerization (dicarboxylic acid) (hereinafter, also referred to as a polycarboxylic acid component not having an operative functional group). The polycarboxylic acid component not having an operative functional group is exemplified by an alicyclic polycarboxylic acid, an aliphatic polycarboxylic acid or an aromatic polycarboxylic acid and the like shown below. The alicyclic polycarboxylic acid is exemplified by an alicyclic dicarboxylic acid such as 1,4-cyclohexanedicarboxylic acid, 1,3-cyclohexanedicarboxylic acid, 1,2-cyclohexanedicarboxylic acid, an acid anhydride thereof and the like. The aliphatic polycarboxylic acid is exemplified by an aliphatic dicarboxylic acid such as succinic acid, adipic acid, azelaic acid, sebacic acid, dodecanedioic acid, dimer acid, 1,2,3-propanetricarboxylic acid, 1,3,5-pentanetricarboxylic acid and the like. The aromatic polycarboxylic acid is exemplified by an aromatic dicarboxylic acid such as terephthalic acid, isophthalic acid, otho-phthalic acid, naphthalene dicarboxylic acid, biphenyldicarboxylic acid, diphenic acid, 5-hydroxyisophthalic acid and the like; an aromatic dicarboxylic acid having sulfonic acid group or sulfonate group such as sulfoterephthalic acid, 5-sulfoisophthalic acid, 4-sulfophthalic acid, 4-sulfonaphthalene-2,7-dicarboxylic acid, 5-(4-sulfophenoxy)isophthalic acid, sulfoterephthalic acid, and/or metal salts thereof, ammonium salts thereof and the like; and the like. Among them, one type or two or more types may be selected and used.

When a total amount of the polycarboxylic acid component in the aromatic polyester is taken as 100 mol %, the aromatic polyester preferably comprises the polycarboxylic acid component not having an operative functional group by 50 mol % or less, more preferably 40 mol % or less, further preferably 30 mol % or less, much further preferably 20 mol % or less, even more preferably 10 mol % or less, especially preferably 5 mol % or less, most preferably 1 mol % or less, and 0 mol % may be acceptable.

The aromatic polyhydric alcohol component for the aromatic polyester of the present invention may or may not have the operative functional group (a reactive functional group except for a functional group involved in polymerization (diol)). The aromatic polyhydric alcohol is preferably an aromatic polyhydric alcohol component not having an operative functional group, more preferably an aromatic diol component not having an operative functional group. The aromatic diol not having an operative functional group is not particularly limited, and preferably exemplified by an aromatic diol compound, a glycol-modified aromatic diol compound, and a glycol-modified aromatic dicarboxylic acid, and more preferably a glycol-modified aromatic diol compound or a glycol-modified aromatic dicarboxylic acid. An aromatic glycol compound is not particularly limited, and exemplified by 1,2-phenylene glycol, 1,3-phenylene glycol, 1,4-phenylene glycol, naphthalenediol, bisphenol A, bisphenol F and the like. Additionally, the glycol-modified aromatic diol compound is not particularly limited, and exemplified by an ethylene oxide adduct of 1,2-phenylene glycol, a propylene oxide adduct of 1,2-phenylene glycol, an ethylene oxide adduct of 1,3-phenylene glycol, a propylene oxide adduct of 1,3-phenylene glycol, an ethylene oxide adduct of 1,4-phenylene glycol, a propylene oxide adduct of 1,4-phenylene glycol, an ethylene oxide adduct of naphthalenediol, a propylene oxide adduct of naphthalenediol, an ethylene oxide adduct of bisphenol A, a propylene oxide adduct of bisphenol A, an ethylene oxide adduct of bisphenol F, a propylene oxide adduct of bisphenol F and the like. Additionally, the glycol-modified aromatic dicarboxylic acid is not particularly limited, and exemplified by ethylene-glycol-modified terephthalic acid, propylene-glycol-modified terephthalic acid, ethylene-glycol-modified isophthalic acid, propylene-glycol-modified isophthalic acid, ethylene-glycol-modified ortho-phthalic acid, propylene-glycol-modified ortho-phthalic acid and the like. Furthermore, the glycol-modified aromatic dicarboxylic acid is also exemplified by a glycol-modified aromatic dicarboxylic acid such as naphthalene dicarboxylic acid, biphenyldicarboxylic acid, diphenic acid, 5-hydroxyisophthalic acid; a glycol-modified aromatic dicarboxylic acid having sulfonic acid group or sulfonate group such as sulfoterephthalic acid, 5-sulfoisophthalic acid, 4-sulfophthalic acid, 4-sulfonaphthalene-2,7-dicarboxylic acid, 5-(4-sulfophenoxy)isophthalic acid, sulfoterephthalic acid, and/or metal salts thereof, ammonium salts thereof; and the like. These may be used alone or in combination of two or more. Among them, the more preferred is an ethylene oxide adduct of 1,4-phenylene glycol, bisphenol A, glycols in which one to several mols of ethylene oxide or propylene oxide is added to each two phenolic hydroxyl group in bisphenols such as an ethylene oxide adduct of bisphenol A (manufactured by Sanyo Chemical Industries, Ltd., NEWPOL (registered trademark) BPE-20T) and a propylene oxide adduct of bisphenol A (manufactured by Sanyo Chemical Industries, Ltd., NEWPOL BP-5P), BHET (ethylene-glycol-modified terephthalic acid) and the like.

When the polyhydric alcohol component in the aromatic polyester is taken as 100 mol %, the aromatic polyester needs to comprise the aromatic diol component by 50 mol % or more, preferably 60 mol % or more, more preferably 70 mol % or more, further preferably 80 mol % or more, much further preferably 90 mol % or more, especially preferably 95 mol % or more, most preferably 99 mol % or more, and 100 mol % may be acceptable.

Furthermore, in addition to the aromatic polyhydric alcohol component, a polyhydric alcohol component, such as an aliphatic polyhydric alcohol, an alicyclic polyhydric alcohol, a glycol having ether bond and the like shown below, can be used in combination.

The aliphatic polyhydric alcohol is exemplified by ethylene glycol, 1,2-propylene glycol, 1,3-propanediol, 1,4-butanediol, 1,5-pentanediol, 2-methyl-1,3-propanediol, neopentyl glycol, 1,6-hexanediol, 3-methyl-1,5-pentanediol, 1,7-heptanediol, 1,8-octanediol, 1,9-nonanediol, 2-ethyl-2-butyl-propanediol, hydroxypivalic acid neopentyl glycol ester, dimethylolheptane, 2,2,4-trimethyl 1,3-pentanediol, polycarbonatediol (manufactured by Asahi Kasei Corp., DURANOL (registered trademark)) and the like. The alicyclic polyhydric alcohol is exemplified by 1,4-cyclohexanediol, 1,4-cyclohexanedimethanol, tricyclodecanediol, tricyclodecanedimethylol, spiroglycol, hydrogenated bisphenol A, an ethylene oxide adduct of hydrogenated bisphenol A, a propylene oxide adduct of hydrogenated bisphenol A and the like. The glycol having ether bond is exemplified by diethylene glycol, triethylene glycol, dipropylene glycol, polyethylene glycol, polypropylene glycol, polytetramethylene glycol, an ethylene oxide adduct of neopentyl glycol or a propylene oxide adduct of neopentyl glycol. Among them, one type or two or more types may be selected and used.

Furthermore, in addition to the aromatic polyhydric alcohol component, a polyhydric alcohol component, such as a divalent or more alicyclic polycarboxylic acid component modified by glycols at both ends or a divalent or more aliphatic polycarboxylic acid component modified by glycols at both ends, can be used. The alicyclic polycarboxylic acid is exemplified by an alicyclic dicarboxylic acid such as 1,4-cyclohexanedicarboxylic acid, 1,3-cyclohexanedicarboxylic acid, 1,2-cyclohexanedicarboxylic acid, acid anhydride thereof and the like. The aliphatic polycarboxylic acid is exemplified by an aliphatic dicarboxylic acid such as succinic acid, adipic acid, azelaic acid, sebacic acid, dodecanedioic acid, dimer acid and the like.

When the polyhydric alcohol component in the aromatic polyester is taken as 100 mol %, the aromatic polyester may preferably comprise the aliphatic polyhydric alcohol component, the alicyclic polyhydric alcohol component and the glycol having ether bond component by 50 mol % or less, more preferably 40 mol % or less, further preferably 30 mol % or less, much further preferably 10 mol % or less, even more preferably 10 mol % or less, especially preferably 5 mol % or less, most preferably 1 mol % or less, and 0 mol % may be acceptable.

The aromatic polyester of the present invention preferably comprises a constitutional unit represented by following formula (1):

[Chemical formula 1]

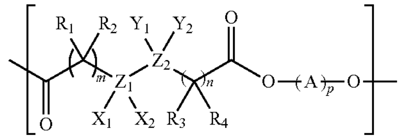

(1)

In the formula (1), $X_1$, $X_2$, $Y_1$ and $Y_2$ are each independently hydrogen (—H), alkyl group, hydroxy group (—OH), sulfanyl group (—SH), carboxy group (—$CO_2$H), formyl group (—CHO), azido group (—$N_3$), halogen (—F, —Cl, —Br, —I), oxygen (=O) or methylidene group (=$CH_2$). The alkyl group is preferably $C_{1-10}$ alkyl group, more preferably $C_{1-5}$ alkyl group, and further preferably $C_{1-3}$ alkyl group. Additionally, the alkyl group may be linear or branched. Halogen may be any of fluorine, chlorine, bromine, iodine, and preferably bromine.

$Z_1$—$X_1$ bond, $Z_2$—$X_2$ bond, $Z_2$—$Y_1$ bond and $Z_2$—$Y_2$ bond are each independently a single bond or a double bond. $Z_1$—$Z_2$ bond is a single bond, a double bond or an S—S bond.

When $X_1$, $X_2$, $Y_1$ and $Y_2$ and all hydrogen or alkyl group; $Z_1$—$X_1$ bond, $Z_1$—$X_2$ bond, $Z_1$—$Y_1$ bond and $Z_2$—$Y_2$ bond are all single bonds, and $Z_1$—$Z_2$ bond is a double bond. When $Z_1$—$Z_2$ bond is an S—S bond; $X_1$, $X_2$, $Y_1$ and $Y_2$ are each independently oxygen (—S(═O)—S—, —S(═O)—S(═O)—, —S(═O)$_2$—S—, —S(═O)$_2$—S(═O)—, or —S(═O)$_2$—S(═O)$_2$—) or absent (—S—S—), and preferably absent (—S—S—).

When $X_1$ is methylidene group; $Z_1$—$X_1$ bond is a double bond, $X_2$ is absent, and $Z_1$—$Z_2$ bond is a single bond. When $X_2$ is methylidene group; $Z_1$—$X_2$ bond is a double bond, $X_1$ is absent, and $Z_1$—$Z_2$ bond is a single bond. When $Y_1$ is methylidene group; $Z_2$—$Y_1$ bond is a double bond, $Y_2$ is absent, and $Z_1$—$Z_2$ bond is a single bond. When $Y_2$ is methylidene group; $Z_2$—$Y_2$ bond is a double bond, $Y_1$ is absent, and $Z_1$—$Z_2$ bond is a single bond.

$R_1$, $R_2$, $R_3$ and $R_4$ are each independently hydrogen or alkyl group. "m" and "n" each independently represent an integer of 0 to 10, preferably an integer of 1 to 5, and more preferably an integer of 1 to 3.

Additionally, in the formula (1), "A" is a residue of the aromatic polyhydric alcohol, preferably a residue of the aromatic diol. The aromatic polyhydric alcohol is not particularly limited, and preferably an aromatic diol compound, a glycol-modified aromatic diol compound, or a glycol-modified aromatic dicarboxylic acid, and more preferably a glycol-modified aromatic diol compound or a glycol-modified aromatic dicarboxylic acid. An aromatic glycol compound is not particularly limited, and exemplified by 1,2-phenylene glycol, 1,3-phenylene glycol, 1,4-phenylene glycol, naphthalenediol, bisphenol A, bisphenol F and the like. Additionally, the glycol-modified aromatic diol compound is not particularly limited, and exemplified by an ethylene oxide adduct of 1,2-phenylene glycol, a propylene oxide adduct of 1,2-phenylene glycol, an ethylene oxide adduct of 1,3-phenylene glycol, a propylene oxide adduct of 1,3-phenylene glycol, an ethylene oxide adduct of 1,4-phenylene glycol, a propylene oxide adduct of 1,4-phenylene glycol, an ethylene oxide adduct of naphthalenediol, a propylene oxide adduct of naphthalenediol, an ethylene oxide adduct of bisphenol A, a propylene oxide adduct of bisphenol A, an ethylene oxide adduct of bisphenol F, a propylene oxide adduct of bisphenol F and the like. Additionally, the glycol-modified aromatic dicarboxylic acid is not particularly limited, and exemplified by ethylene-glycol-modified terephthalic acid, propylene-glycol-modified terephthalic acid, ethylene-glycol-modified isophthalic acid, propylene-glycol-modified isophthalic acid, ethylene-glycol-modified ortho-phthalic acid, propylene-glycol-modified ortho-phthalic acid and the like. These may be used alone or in combination of two or more. Among them, an ethylene oxide adduct of bisphenol A, a propylene oxide adduct of bisphenol A, or ethylene-glycol-modified terephthalic acid are preferable. "p" represents an integer of 1 to 10, preferably an integer of 1 to 5, and more preferably an integer of 1 to 3.

When a total constitutional unit in the aromatic polyester is taken as 100 mol %, the aromatic polyester of the present invention preferably comprise the constitutional unit represented by formula (1) by 50 mol % or more, more preferably 60 mol % or more, further preferably 70 mol % or more, much further preferably 80 mol % or more, even more preferably 90 mol % or more, especially preferably 95 mol % or more, most preferably 99 mol % or more, and 100 mol % may be acceptable.

The preferred formula (1) is exemplified by following formulae (2) to (5).

[Chemical formula 2]

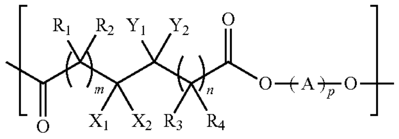

(2)

In the formula (2), it is preferable that $X_1$, $X_2$, $Y_1$ and $Y_2$ are each independently hydrogen, alkyl group, hydroxy group, sulfanyl group, carboxy group, formyl group, azido group or halogen, wherein not all $X_1$, $X_2$, $Y_1$ and $Y_2$ are hydrogen or alkyl group. It is more preferable that $X_1$ and/or $Y_1$ are/is hydroxy group, sulfanyl group, carboxy group, formyl group, azido group or halogen. It is further preferable that $X_1$ is hydroxy group, sulfanyl group, carboxy group, formyl group, azido group or halogen, and $Y_1$ is hydrogen. Structure of formula (2) enables various chemical modifications, such as giving a site for initiating living radical polymerization, and the like.

[Chemical formula 3]

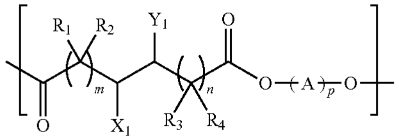

(3)

In the formula (3), it is preferable that $X_1$ and $Y_1$ are each independently methylidene group. It is more preferable that one of $X_1$ or $Y_1$ is methylidene group and the other is hydrogen. It is further preferable that $X_1$ is methylidene group and $Y_1$ is hydrogen.

[Chemical formula 4]

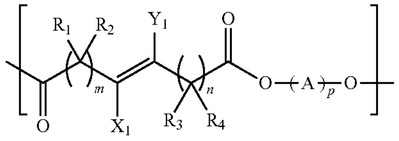

(4)

In the formula (4), it is preferable that $X_1$ and $Y_1$ are each independently hydrogen or alkyl group, and more preferably hydrogen. When $X_1$ and/or $Y_1$ are/is alkyl group, carbon number thereof is preferably 1 to 10, more preferably 1 to 5, and further preferably 1 to 3 Additionally, the alkyl group may be linear or branched. Structure formula (4) enables various chemical modifications, such as giving a reactive site for thiol-ene reaction and Michael addition reaction, and the like.

[Chemical formula 5]

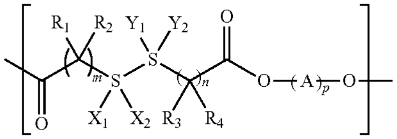

(5)

In the formula (5), it is preferable that $X_1$, $X_2$, $Y_1$ and $Y_2$ are each independently absent (a disulfide bond) or oxygen (=O). It is more preferable that $X_1$, $X_2$, $Y_1$ and $Y_2$ are all absent (a disulfide bond).

In the formulae (2) to (5), it is preferable that $R_1$, $R_2$, $R_3$ and $R_4$ are each independently hydrogen or alkyl group, and more preferably hydrogen. When $R_1$ to $R_4$ are each independently alkyl group, carbon number thereof is preferably 1 to 10, more preferably 1 to 5, and further preferably 1 to 3. Additionally, the alkyl group may be linear or branched. "m" and "n" each independently represent an integer of 0 to 10, preferably an integer of 1 to 5, and more preferably an integer of 1 to 3. Especially, in the formula (2) and formula (3), it is preferable that "m" is 0 and "n" is 1; in the formula (4), it is preferable that both "m" and "n" are 0; in the formula (5), it is preferable that both "m" and "n" are 2. In the any of formulae (2) to (5), "p" preferably represents an integer of 1 to 10, more preferably an integer of 1 to 5, and further preferably an integer of 1 to 3.

The preferred formula (1) is not particularly limited, and exemplified by following structures.

[Chemical formula 6]

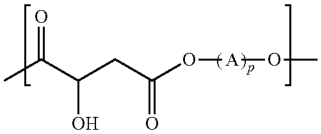

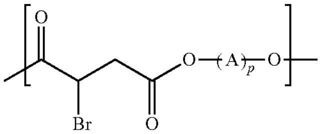

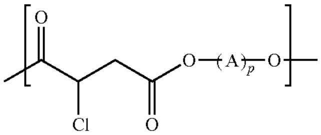

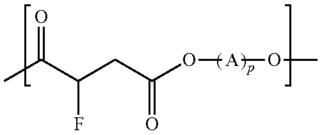

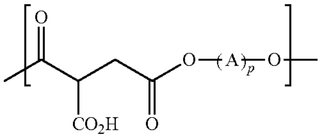

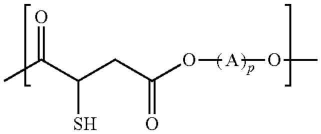

-continued

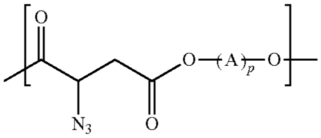

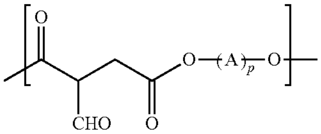

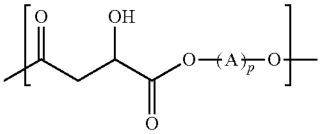

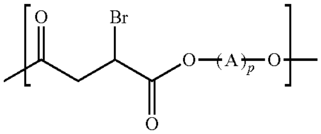

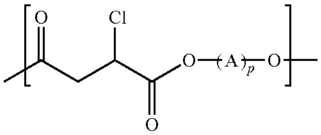

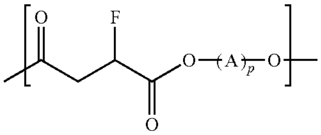

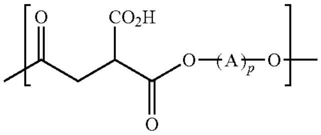

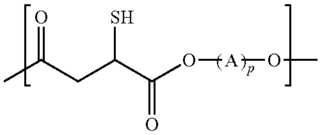

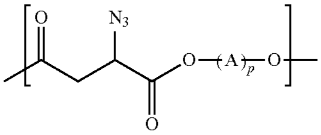

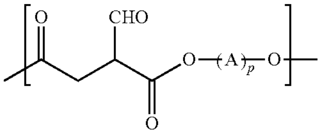

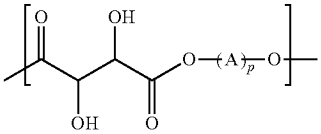

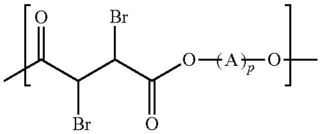

-continued
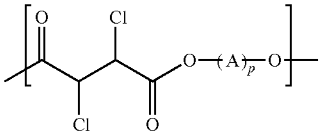
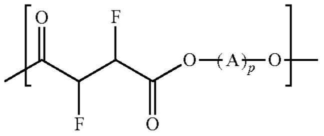
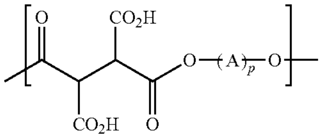
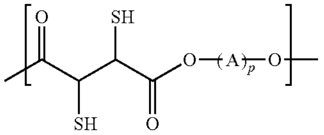
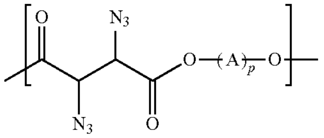
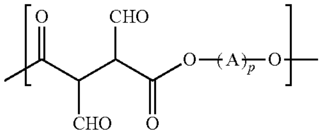
[Chemical formula 7]
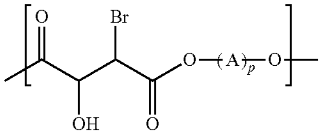
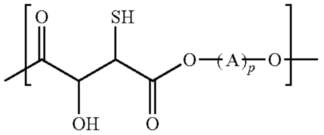
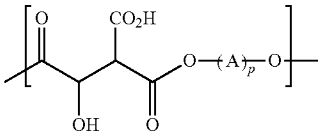
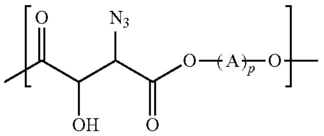
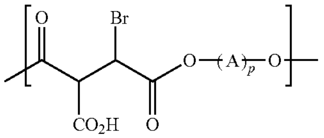
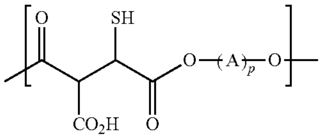
-continued
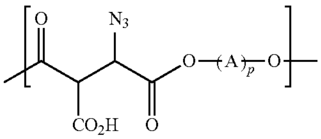
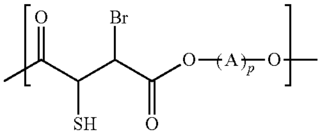
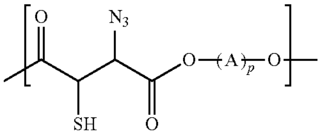
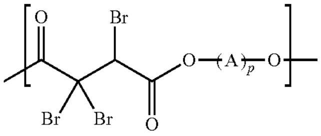
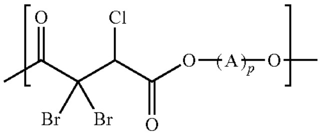
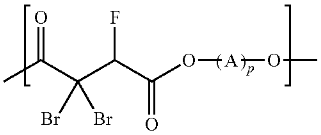
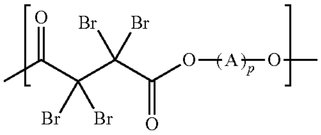
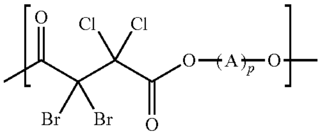
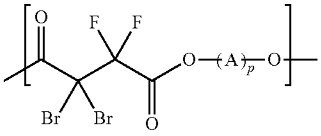
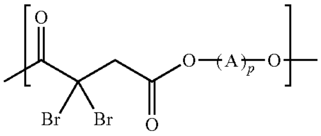
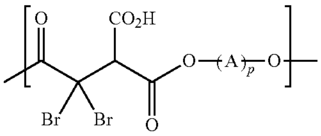
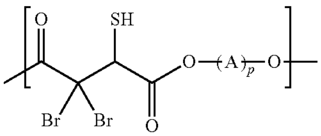

-continued

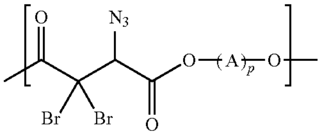

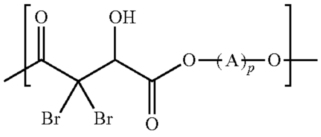

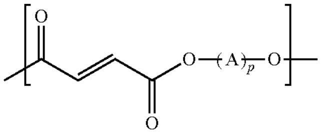

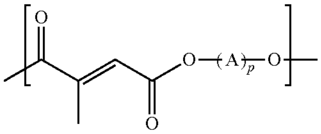

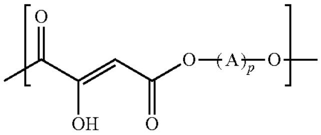

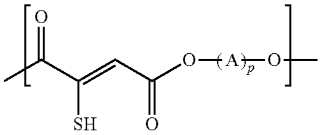

[Chemical formula 8]

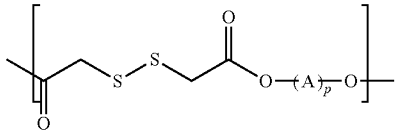

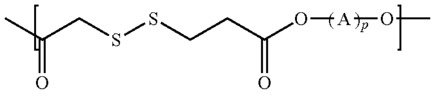

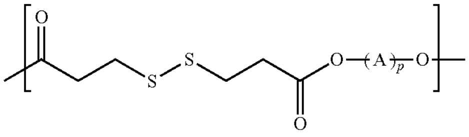

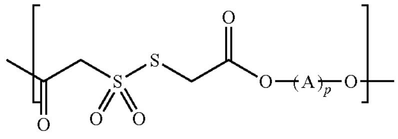

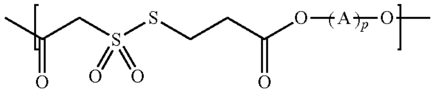

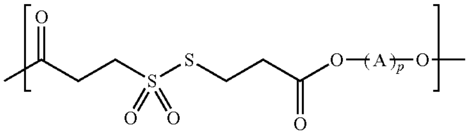

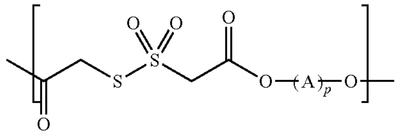

-continued

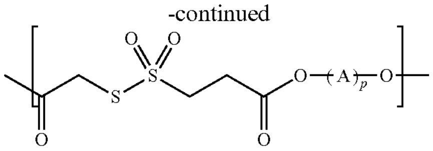

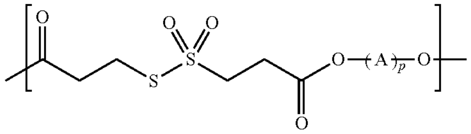

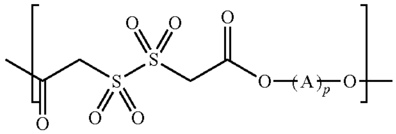

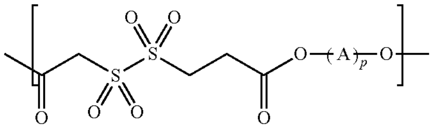

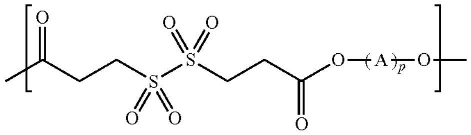

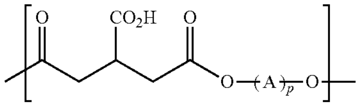

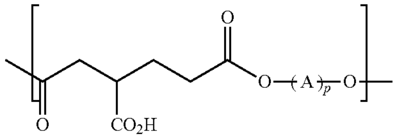

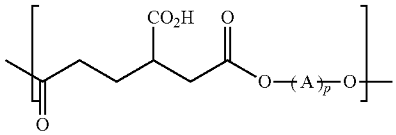

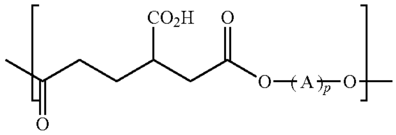

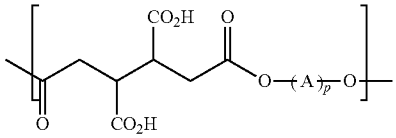

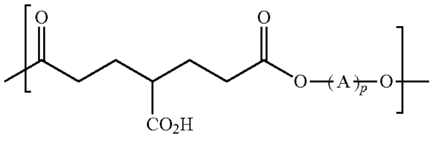

The aromatic polyester of the present invention preferably comprises fluorine by 500 mass ppm or more, and because of showing water repellency and oil repellency, more preferably 1000 mass ppm or more, and further preferably 2000 mass ppm or more. Additionally, because of good heat resistance and chemical resistance, the aromatic polyester preferably comprises fluorine by 10000 mass ppm or less, more preferably 8000 mass ppm or less, and further preferably 5000 mass ppm or less.

The aromatic polyester of the present invention preferably comprises sulfur by 250 mass ppm or more, and because a melting point tends to rise, more preferably 500 mass ppm or more, further preferably 1000 mass ppm or more. Additionally, because of good heat resistance and chemical resistance, the aromatic polyester preferably comprises sulfur by 5000 mass ppm or less, more preferably 4000 mass ppm or less, and further preferably 3000 mass ppm or less.

The aromatic polyester of the present invention is substantially free from an organic solvent, preferably. By substantially not comprising the organic solvent, it is possible to produce an adhesive and a paint that is excellent for human body and environment. The term "the aromatic polyester is substantially free from an organic solvent" means that, in 100 mass % of the aromatic polyester, the aromatic polyester preferably comprises an organic solvent by 5 mass % or less, more preferably 2 mass % or less, further preferably 1 mass % or less, and especially preferably 0 mass %.

The organic solvent is exemplified by an aromatic hydrocarbon such as benzene, toluene, xylene and the like; an aliphatic hydrocarbon such as hexane, heptane, octane and the like; a ketone solvent such as acetone, methyl ethyl ketone and the like; an ester solvent such as ethyl acetate, propyl acetate and the like; an ether solvent such as dimethyl ether, diethyl ether and the like; an aprotic solvent such as N-methylpyrrolidone (NMP), N,N-dimethyiformamide (DMF) and the like.

The aromatic polyester of the present invention preferably has a number average molecular weight of 2,000 or more and 30,000 or less, more preferably 3,000 or more and 25,000 or less, and further preferably 4,000 or more and 20,000 or less. If the number average molecular weight is the lower limit or more, coated film will be tough and the physical characteristics of the coated film when subjected to processing will be good. Additionally, if the number average molecular weight is the upper limit or less, it will be possible to prevent melt viscosity during polycondensation from becoming too high and take-out from reaction vessel (flask) will be easy The aromatic component of the aromatic polyester of the present invention is derived from the aromatic polyhydric alcohol component. In general, monomers comprising aromatic component has a high melting point of 200 to 300° C. Therefore, when polymerizing polyester, it is necessary to react at a temperature of the melting point or more, and it is difficult to melt at a temperature of 150° C. or lower to be uniform. However, by modifying both ends of the aromatic carboxylic acid with glycol component, melting point can be lowered and polymerization can be conducted at a low temperature. For example, melting point of terephthalic acid, which is raw material for PET, is 300° C. In contrast, melting point of BHET (bis(2-hydroxyethyl) terephthalate), which is modified with ethylene glycol at both ends, is 110° C., thereby it is possible to conduct polycondensation at a temperature of 150° C. or lower.

In addition to BHET, ethylene glycol 2 mol adduct of bisphenol and propylene glycol 5 mol adduct of bisphenol, which are modified with glycol component at both ends, make it possible to conduct polymerization at a low temperature by lowering melting point thereof.

Furthermore, the use of triflate catalyst (trifluoromethanesulfonate catalyst) enables esterification reaction at a low temperature of about 80 to 150° C. Conventionally, when monomers comprising a functional group except for the functional group involved in polymerization (hydroxy group, sulfanyl group, carboxy group, formyl group, azido group, halogen, methylidene group and the like), reactions were conducted at a high temperature. Therefore, since these functional groups caused side reactions such as hydrolysis (solvolysis), elimination and the like, it was difficult to produce the aromatic polyester. In contrast, in the present invention, it is possible to conduct reactions at a low temperature. Even if monomers comprising a functional group except for the functional group involved in polymerization (the operative functional group) are used, side reactions do not occur, resulting in producing the aromatic polyester. Therefore, the aromatic polyester can be produced by a process comprising a step of low-temperature melt polycondensation at about 80 to 150° C.

Triflate catalyst is exemplified by rare-earth triflate catalyst. Rare-earth metals comprised in the rare-earth triflate catalyst are specifically exemplified by scandium (Sc), yttrium (Y), lanthanide chemical elements such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu) and the like, and those comprising them are effective. The rare-earth metals may be used alone or in combination. Among them, scandium is preferable. Triflate catalyst except for the rare-earth metals is specifically exemplified by those comprising copper (Cu), zinc (Zn), tin (Sn), hafnium (Hf), bismuth (Bi) and the like, and those are effective. The triflate is exemplified by $X(OSO_2CF_3)$; wherein X represents rare-earth or the other chemical elements. Among them, X is preferably scandium (Sc).

The aromatic polyester can be produced by melt polycondensation at a low temperature, specifically and preferably 150° C. or lower. Since side reactions due to the functional group except for the functional group involved in polymerization (the operative functional group) can be suppressed, it is more preferably 140° C. or lower, further preferably 130° C. or lower, much further preferably 120° C. or lower, especially preferably 110° C. or lower. The lower limit is not particularly limited, and preferably 60° C. or higher. Additionally, since reaction time can be shortened, it is more preferably 70° C. or higher, further preferably 80° C. or higher, and especially preferably 90° C. or higher.

The aromatic polyester can be polymerized without substantially using organic solvent. The term "without substantially using organic solvent" means that the aromatic polyester preferably comprises organic solvent in an amount of 5 parts by mass or less, more preferably 2 parts by mass or less, further preferably 1 part by mass or less, and especially preferably 0 parts by mass, with respect to 100 parts by mass of the produced aromatic polyester. By substantially not using organic solvent, volumetric efficiency of reaction can be improved, and furthermore the resin that is excellent for human body and environment can be produced.

The aromatic polyester can be polymerized without substantially using radical inhibitor. The term "without substantially using radical inhibitor" means that the aromatic polyester preferably comprises radical inhibitor in amount of 5 parts by mass or less, more preferably 2 parts by mass or less, further preferably 1 part by mass or less, and especially preferably 0 parts by mass, with respect to 100 parts by mass of the produced an aromatic polyester. By substantially not using radical inhibitor, the aromatic polyester can be produced efficiently, and the aromatic polyester does not comprise impurities derived from radical inhibitor. The radical inhibitor is exemplified by hydroquinone, 2-methylhydroquinone, benzoquinone, 2-methylbenzoquinone and the like.

Reaction time can be appropriately set according to the type of monomers (the polycarboxylic acid component and the aromatic diol component), the type of catalysts or reaction temperature. Specifically, it is preferably 1 to 20 hours, more preferably 2 to 15 hours, and further preferably 3 to 12 hours.

The aromatic polyester of the present invention can be used for an adhesive or a paint. The content of the aromatic polyester in the adhesive or the paint is preferably 50 mass % or more, more preferably 60 mass % or more, and further preferably 70 mass % or more, in terms of solid content. Additionally, it is preferably 95 mass % or less, and more preferably 90 mass % or less.

EXAMPLES

Hereinafter, the present invention will be more specifically explained with reference to examples, but the present invention is not limited to the aspects to the following examples, and can be appropriately modified within the scope not departing from the gist of the present invention. These variations are included in technical scope of the present invention.

In the following, unless otherwise noted, "parts" represents parts by mass. Additionally, measurement and evaluation methods employed in the present application are as follows.

Resin Composition

The aromatic polyester was dissolved into deuterated chloroform. By using NMR device (manufactured by VARIAN, 400-MR), a molar ratio was obtained from a ratio of integrated value in $^1$-NMR analysis.

Number Average Molecular Weight (Mn)

The aromatic polyester sample was dissolved into N,N-dimethylformamide so that resin concentration comes to about 0.5 mass %. Thereafter, it was filtered with a polytetrafluoroethylene membrane filter having a pore size of 0.5 μm to make a sample for measurement. Molecular weight was measured by gel permeation chromatography (GPC) using N,N-dimethylformamide as mobile phase and a differential refractometer as a detector. Measurement was performed at a flow rate of 1 mL/min and a column temperature of 30° C. KF-802, 804L, 806L manufactured by Showa Denko K. K. was used as the column. Monodisperse polystyrene was used as a standard for molecular weight. When calculating number average molecular weight, the part corresponding to less than 1000 of molecular weight was omitted.

Elemental Analysis (Content of Fluorine and Sulfur)

Methods for Pretreatment and Measurement

Sample (aromatic polyester, 20 mg) was collected in a porcelain boat, and burned in a tube furnace equipped with a quartz pipe (manufactured by Mitsubishi Chemical Analytech Co., Ltd., AQF-2100H). Combustion gas was absorbed with hydrogen peroxide solution (0.3 mass %). After that, fluoride ion and sulfate ion in absorbent solution were measured by ion chromatography (manufactured by Thermo Fisher Scientific, Inc., ICS-1600).

Conditions for Automatic Furnace Combustion

Device: manufactured by Mitsubishi Chemical. Analytech Co., Ltd., automatic furnace for combustion AQF-2100H Decomposition temperature of sample: 1000° C.

Burning program: 15 minutes

Absorbent liquid composition: aqueous hydrogen peroxide solution (0.3 mass %)

Conditions for Ion Chromatography Analysis

Device: manufactured by Thermo Fisher Scientific, Inc., ion chromatography system ICS-1600

Column: anion-exchange column AS12A

Eluent composition: mixed aqueous solution of sodium carbonate/sodium hydrogen carbonate Separating program: 15 minutes Detector: electronical conductivity detector

Content of Organic Solvent

Sample (aromatic polyester, about 0.5 g) was weighed on an aluminum dish (referred to as A). Next, the sample was put in a dryer at 150° C., and dried under a reduced pressure of 5 mmHg or less for 2 hours. After drying, the sample was cooled so that it reached to a room temperature, and taken out (referred to as B). According to following equation, content of organic solvent was calculated.

$$\text{Content of organic solvent (mass \%)}=(A-B)/A\times 1.00 \qquad \text{Equation:}$$

Example 1

Process for Producing Aromatic Polyester No. 1

In a glass flask (50 ml) equipped with a stirrer, bis(2-hydroxyethyl) terephthalate (BHET, 100 mol %), maleic acid (100 mol), and scandium triflate (1.0 mol) were placed and homogenized at 100° C. After the raw materials were dissolved, pressure inside reaction system was gradually reduced to 5 mmHg over 30 minutes. Further, under vacuum of 0.3 mmHg or less, polycondensation was conducted at 110° C. for 4 hours. After that, contents were taken out and cooled. Composition, number average molecular weight and the like of the produced aromatic polyester No. 1 were shown in Table 1.

Examples 2 to 11, Comparative Examples 1 to 3

Process for Producing Aromatic Polyester No. 2 to 14

Aromatic polyesters No. 2 to 14 was produced in the same manner as the aromatic polyester No. 1 except for changing raw materials and ratio thereof, and the same evaluation as the aromatic polyester No. 1 was performed. Evaluation results were shown in Table 1 to Table 2. In Example 7, DURANOL-T5650E (polycarbonatediol manufactured by Asahi Kasei Chemicals Corp.: mixture of 1,5-pentanediol/1,6-hexanediol, number average molecular weight about 500) and adipic acid (50 mol %) were used as polyhydric alcohol component. In Example 11, 1,5-pentanediol (50 mol %) was used as polyhydric alcohol component.

TABLE 1

| Example | Resin No. | Polycarboxylic acid component (mol %) | | Polyhydric alcohol component (mol %) | | Catalyst (mol %) | Reaction temperature (° C.) | Reaction time (hr) |
|---|---|---|---|---|---|---|---|---|
| 1 | 1 | Maleic acid | 100 | BHET | 100 | $Sc(OTf)_3$ (1.0) | 110 | 4 |
| 2 | 2 | Maleic acid | 100 | BPE-20T | 100 | $Sc(OTf)_3$ (1.0) | 100 | 5 |
| 3 | 3 | Maleic acid | 100 | BP-5P | 100 | $Sc(OTf)_3$ (1.0) | 100 | 11.5 |
| 4 | 4 | Malic acid | 100 | BBET | 100 | $Sc(OTf)_3$ (1.0) | 110 | 2 |
| 5 | 5 | Malic acid | 100 | BBET | 100 | $Sc(OTf)_3$ (0.5) | 110 | 4 |
| 6 | 6 | Malic acid | 100 | BBET | 100 | $Sc(OTf)_3$ (0.2) | 110 | 6 |
| 7 | 7 | 1,2,3-propanetricacboxylic acid | 50 | BHET | 100 | $Sc(OTf)_3$ (1.0) | 100 | 3 |
| | | Adipic acid | 50 | | | | | |
| 8 | 8 | Thiomalic acid | 100 | BHET | 100 | $Sc(OTf)_3$ (1.0) | 100 | 5 |
| 9 | 9 | Thiomalic acid | 100 | BBET | 50 | $Sc(OTf)_3$ (1.0) | 95 | 6 |
| | | | | Duranol T5650E | 50 | | | |
| 10 | 10 | 3,3'-dithiodipropionic acid | 100 | BHET | 100 | $Sc(OTf)_3$ (0.5) | 115 | 5 |
| 11 | 11 | 3,3'-dithiodipropionic acid | 100 | EHET | 50 | $Sc(OTf)_3$ (0.5) | 115 | 5 |
| | | | | 1.5-pentanediol | 50 | | | |

| Example | Resin No. | Mn ($\times 10^4$) | Fluorine content (ppm by mass) | Sulfur content (ppm by mass) | Structure of aromatic polyester | Content of constitutional unit represented by formula (1) (mol %) |
|---|---|---|---|---|---|---|
| 1 | 1 | 0.97 | 4200 | 2200 | Formula(4), m, n = 0, X1, Y1 = hydrogen, A = BHET | 100 |
| 2 | 2 | 0.97 | 3857 | 2285 | Formula(4), m, n = 0, X1, Y1 = hydrogen, A = BPE-20T | 100 |
| 3 | 3 | 0.44 | 4900 | 2600 | Formula(4), m, n = 0, X1, Y1 = hydrogen, A = BP-5P | 100 |
| 4 | 4 | 0.88 | 3100 | 1600 | Formula(2), m, n = 0, X1 = OH, X2, Y1-Y2 = hydrogen, A = BHET | 100 |
| 5 | 5 | 0.9 | 1500 | 800 | Formula(2), m, n = 0, X1 = OH, X2, Y1-Y2 = hydrogen, A = BHET | 100 |
| 6 | 6 | 0.9 | 600 | 350 | Formula(2), m, n = 0, X1 = OH, X2, Y1-Y2 = hydrogen, A = BHET | 100 |
| 7 | 7 | 1.04 | 3925 | 2313 | Formula(2), m = 1, n = 0, X1 = COOH, X2, Y1-Y2, R1~R2 = hydrogen, A = BHET | 50 |
| 8 | 8 | 0.9 | 4027 | 2397 | Formula(2), m, n = 0, X1 = SH, X2, Y1~Y2 = hydrogen, A = BHET | 100 |
| 9 | 9 | 0.99 | 3549 | 2116 | Formula(2), m, n = 0, X1 = SH, X2, Y1~Y2 = hydrogen, A = BHET, Duranol T5650E | 100 |
| 10 | 10 | 0.3 | 1500 | 800 | Formula(5), m = 2, n = 2, X1-X2, Y1-Y2, R1~R4 = hydrogen, A = BHET | 100 |

TABLE 1-continued

| | | | | | | |
|---|---|---|---|---|---|---|
| 11 | 11 | 0.26 | 1500 | 800 | Formula(5), m = 2, n = 2, X1-X2, Y1-Y2, R1~R4 = hydrogen, A = BHET, 1.5-pentanediol | 100 |

TABLE 2

| Comparative Example | Resin No. | Polycarboxylic acid component (mol %) | | Polyhydric alcohol component (mol %) | | Catalyst (mol %) | Reaction temperature (° C.) | Reaction time (hr) | Mn ($\times 10^4$) | Note | Content of constitutional unit represented by formula (1) (mol %) |
|---|---|---|---|---|---|---|---|---|---|---|---|
| 1 | 12 | Maleic acid | 100 | BHET | 100 | N/A | 100 | 4 | — | Polycondensation not proceeded | 0 |
| 2 | 13 | Maleic acid | 100 | BHET | 100 | Al | 100 | 4 | — | Polycondensa ion not proceeded | 0 |
| 3 | 14 | Thiomalic acid | 100 | BHET | 100 | $Sc(OTf)_3$ (1.0) | 120 | 6.5 | — | Gelation | 0 |

No. 3 In the system where a propylene oxide adduct of bisphenol A (BP-5P) was used as the polyhydric alcohol component, reaction was slower for the secondary OH group involved in the reaction than the other primary OH group. Therefore, it is considered that molecular weight did not increase so much even though reaction time was long (11.5 hours) and aromatic polyester comprised structure of formula (1).

No. 5 Even when amount of catalyst was reduced from 1.0 mol % to 0.5 mol % using the same raw material as No. 4, aromatic polyester comprising structure of formula (1) was produced. However, it took 4 hours for the reaction to produce a polymer with the same molecular weight.

No. 6 Even when amount of catalyst was reduced from 1.0 mol % to 0.2 mol % using the same raw material as No. 4, aromatic polyester comprising structure of formula (1) was produced. However, it took 6 hours for the reaction to produce a polymer with the same molecular weight.

No. 12 In the system of no catalysts, even when the same reaction was conducted, esterification reaction did not proceed and molecular weight did not increase. Therefore, polyester comprising structure of formula (1) could not be produced.

No. 13 When a general transesterification catalyst such as Al catalyst was used, esterification reaction did not proceed and molecular weight did not increase. Therefore, aromatic polyester comprising structure of formula (1) could not be produced.

No. 14 When thiomalic acid was used as dicarboxylic acid component, gelation occurred due to long-time reaction at a high temperature. Thereby, aromatic polyester comprising structure of formula (1) could not be produced. This is thought to be due to the formation of three-dimensional crosslinks by intramolecular coupling of branched SH groups in the polyester molecule, which was produced by melt polycondensation.

INDUSTRIAL APPLICABILITY

The aromatic polyester of the present invention comprises a specific constitutional unit. Additionally, by using a specific polycarboxylic acid component and a specific aromatic diol component, the aromatic polyester can be synthesized by dehydration polycondensation under mild conditions without using solvent. By this method, it is possible to synthesize a polyester having a double bond at a main chain or a side chain thereof, or a polyester having a functional group except for functional groups involved in condensation. The polyester comprising a double bond at a main chain gives a reactive site for thiol-ene reaction and Michael reaction. The polyester comprising halogen at a side chain enables various chemical modification, such as giving a site for initiating living radical polymerization, and the like. The polyester comprising mercapto group at a side chain gives a reactive site for Michael addition reaction. Therefore, these are very useful polymers.

The invention claimed is:

1. A process, comprising a step of conducting low-temperature melt polycondensation at 80 to 150° C. to produce an aromatic polyester comprising a polycarboxylic acid component and a polyhydric alcohol component as a copolymerization component, wherein, the aromatic polyester comprises a polycarboxylic acid component having an operative functional group by 50 mol % or more when a total amount of the polycarboxylic acid component is taken as 100 mol %, the aromatic polyester comprises an aromatic polyhydric alcohol component by 50 mol % or more when a total amount of the polyhydric alcohol component is taken as 100 mol %, the aromatic polyhydric alcohol component is an aromatic diol compound, a glycol-modified aromatic diol compound, or a glycol-modified aromatic dicarboxylic acid, wherein the glycol-modified aromatic diol compound is at least one selected from the group consisting of an ethylene oxide adduct of 1,2-phenylene glycol, a propylene oxide adduct of 1,2-phenylene glycol, an ethylene oxide adduct of 1,3-phenylene glycol, a propylene oxide adduct of 1,3-phenylene glycol, an ethylene oxide adduct of 1,4-phenylene glycol, a propylene oxide adduct of 1,4-phenylene glycol, an ethylene oxide adduct of naphthalenediol, a propylene oxide adduct of naphthalenediol, an ethylene oxide adduct of bisphenol A and a propylene oxide adduct of bisphenol A, and the aromatic polyester comprises fluorine by 500 mass ppm to 4,200 mass ppm, and sulfur by 250 mass ppm to 2,397 mass ppm.

2. The process according to claim 1, wherein the operative functional group is one or more selected from the group consisting of an unsaturated bond, hydroxy group, sulfanyl group, carboxy group, formyl group, azido group, halogen, disulfide group, sulfonyl group, sulfinyl group and methylidene group.

3. The process according to claim 1, wherein the aromatic polyester comprises a constitutional unit represented by following formula (4):

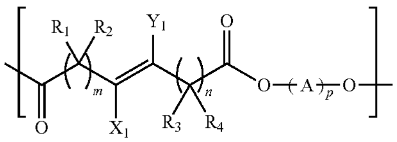

(4)

wherein, in the formula (4), $X_1$ and $Y_1$ are each independently hydrogen or alkyl group, "A" is a residue of the aromatic polyhydric alcohol, $R_1$, $R_2$, $R_3$ and $R_4$ are each independently hydrogen or alkyl group, "m" and "n" each independently represent an integer of 0 to 10, and "p" represents an integer of 1 to 10.

4. The process according to claim 1, wherein in 100 mass % of the aromatic polyester, the aromatic polyester comprises an organic solvent by 5 mass % or less.

5. The process according to claim 1, wherein the aromatic polyhydric alcohol component is the glycol-modified aromatic dicarboxylic acid.

6. The process according to claim 1, wherein the aromatic polyester has a number average molecular weight of 2,000 or more and 30,000 or less.

7. The process according to claim 1, wherein the reaction temperature of the low-temperature melt polycondensation is 90 to 130° C.

8. The process according to claim 1, wherein the aromatic polyester comprises a radical inhibitor in amount of 5 parts by mass or less with respect to 100 parts by mass of the aromatic polyester.

9. The process according to claim 1, wherein a reaction time of the low-temperature melt polycondensation is 1 to 20 hours.

10. The process according to claim 1, wherein the polyhydric alcohol component other than the aromatic polyhydric alcohol component is selected from the group consisting of an aliphatic polyhydric alcohol, an alicyclic polyhydric alcohol, a glycol having an ether bond, a divalent or more alicyclic polycarboxylic acid component modified by glycols at both ends, and a divalent or more aliphatic polycarboxylic acid component modified by glycols at both ends.

11. The process according to claim 1, wherein the polyhydric alcohol component consists of the aromatic polyhydric alcohol component.

* * * * *